United States Patent
Finlayson

(10) Patent No.: US 9,491,159 B2
(45) Date of Patent: *Nov. 8, 2016

(54) SECURE CHALLENGE SYSTEM FOR VERIFYING ACCESS RIGHTS TO MEDIA CONTENT

(71) Applicant: Google Inc., Mountain View, CA (US)

(72) Inventor: Graham Campbell Finlayson, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,811

(22) Filed: Oct. 19, 2015

(65) Prior Publication Data

US 2016/0044015 A1    Feb. 11, 2016

Related U.S. Application Data

(63) Continuation of application No. 14/149,847, filed on Jan. 8, 2014, now Pat. No. 9,166,964.

(51) Int. Cl.
| | | |
|---|---|---|
| *G06F 21/00* | (2013.01) | |
| *H04L 29/06* | (2006.01) | |
| *G06F 21/32* | (2013.01) | |
| *H04N 21/254* | (2011.01) | |
| *H04N 21/835* | (2011.01) | |
| *H04N 21/84* | (2011.01) | |
| *G06F 21/60* | (2013.01) | |
| *H04L 9/32* | (2006.01) | |
| *G06F 21/12* | (2013.01) | |
| *G06F 21/10* | (2013.01) | |

(52) U.S. Cl.
CPC ............. *H04L 63/08* (2013.01); *G06F 21/10* (2013.01); *G06F 21/121* (2013.01); *G06F 21/32* (2013.01); *G06F 21/604* (2013.01); *H04L 9/3271* (2013.01); *H04N 21/2541* (2013.01); *H04N 21/835* (2013.01); *H04N 21/84* (2013.01); *G06F 21/105* (2013.01); *G06F 21/12* (2013.01); *H04L 2209/605* (2013.01)

(58) Field of Classification Search
CPC ...... G06F 21/10; G06F 21/105; G06F 21/16; G06F 21/12; G06F 21/121
See application file for complete search history.

(56) References Cited

U.S. PATENT DOCUMENTS

| | | | |
|---|---|---|---|
| 2004/0111617 A1 | 6/2004 | Patrick | |
| 2008/0301435 A1 | 12/2008 | Simon et al. | |
| 2011/0087690 A1 | 4/2011 | Cairns | |
| 2012/0117197 A1 | 5/2012 | Cassidy et al. | |
| 2014/0358938 A1* | 12/2014 | Billmaier | G06F 17/30097 707/747 |

FOREIGN PATENT DOCUMENTS

WO    2013137573 A1    9/2013

* cited by examiner

*Primary Examiner* — Edward Zee
(74) *Attorney, Agent, or Firm* — Morris & Kamlay LLP

(57) ABSTRACT

Described is a technique for securely verifying access rights to a media file stored on a user device. By verifying the access rights to the media file, a server may provide access to a licensed version of the media from a media library in a remote location such as server for a cloud-based service. When a media file is confirmed to be available in a media library, a cryptographic a hash function that incorporates a random value or "salt" is used to verify that a user is in possession of an entire media file. Accordingly, the techniques described herein improve the security for verifying that a user is in possession of a media file by preventing the use of pre-calculated hashes.

19 Claims, 3 Drawing Sheets

SECURE CHALLENGE SYSTEM FOR VERIFYING ACCESS RIGHTS TO MEDIA CONTENT

BACKGROUND

Users now have the ability to access media remotely from a cloud-based service and users often desire the ability to remotely access a music collection that may be stored on a user's device. Accordingly, a user may wish to upload their music collection to the cloud. When providing a cloud-based service, a provider may have to conform to licensing and/or access terms that may be dictated by content distributors. For example, the provider may have to verify particular rights to content before allowing the user to upload an entire media collection to a provider's server. In addition, uploading an entire media collection requires a considerable amount of bandwidth and resource management. Accordingly, in order to provide such a service, a provider may require an efficient and reliable way to store, serve, and grant access rights to media.

BRIEF SUMMARY

In an implementation, described is a computer-implemented method of verifying access rights to a media file. The method may include receiving, from a device associated with a user account, a first fingerprint generated from a media file stored on the device and determining a licensed version of the media file is available in a media library stored on a server by verifying that the received first fingerprint matches a second fingerprint generated from an instance of the licensed version of the media file. The method may include sending, to the device, a generated random value and receiving, from the device, a first hash value generated from a predefined portion of the media file combined with the generated random value. The method may also include determining that the received first hash value matches a second hash value generated from the predefined portion of the instance of the licensed version of the media file combined with the generated random value and authorizing the user account to remotely access the licensed version of the media file stored on the server.

In an implementation, described is a server for verifying access rights to a media file. The server may include a processor configured to receive, from a device associated with a user account, a first fingerprint generated from a media file stored on the device and determine a licensed version of the media file is available in a media library stored on a server by verifying that the received first fingerprint matches a second fingerprint generated from an instance of the licensed version of the media file. The processor may be configured to send, to the device, a generated random value and receive, from the device, a first hash value generated from a predefined portion of the media file combined with the generated random value. The server may also be configured to determine that the received first hash value matches a second hash value generated from the predefined portion of the instance of the licensed version of the media file combined with the generated random value and authorize the user account to remotely access the licensed version of the media file stored on the server.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Described is a technique and system for securely verifying access rights to a media file stored on a user device. By verifying the access rights to the media file, a server may provide access to a licensed version of the media from a media library in a remote location such as a server. The techniques and systems described herein improve the security in which media is verified over systems that merely match the media using metadata or a simple hash functions. Specifically, after a media file is determined to be available in the media library, a hash of an instance of the licensed version of the media file is generated along with a random value or "salt" in order provide an addition layer of security. In addition, the hash may include a cryptographic hash and may be generated based on a randomized portion of the media file or the entire media file. Accordingly, even if a hash value is intercepted, the system is protected from pre-calculated hashes that may create the illusion of owning a particular media file.

In an implementation, the process for verifying access rights may be performed in conjunction with a music service that may provide a catalog of tracks (or songs) available for download. For example, a user may be provided with unlimited access to a catalog of content. The user may wish to access their music collection remotely, and accordingly, a service may perform a "matching" service to identify existing music files stored on a device. For example, the music collection may represent the user's existing media archive, so that it can be replicated, to the extent possible, within the parameters of the music service. Content stored on a device associated with a user account may be compared with the content available through the service to determine a list of matching tracks. Files corresponding to the matching tracks may then be associated with a user account without necessarily having to upload individual files from the device.

Figure 1:
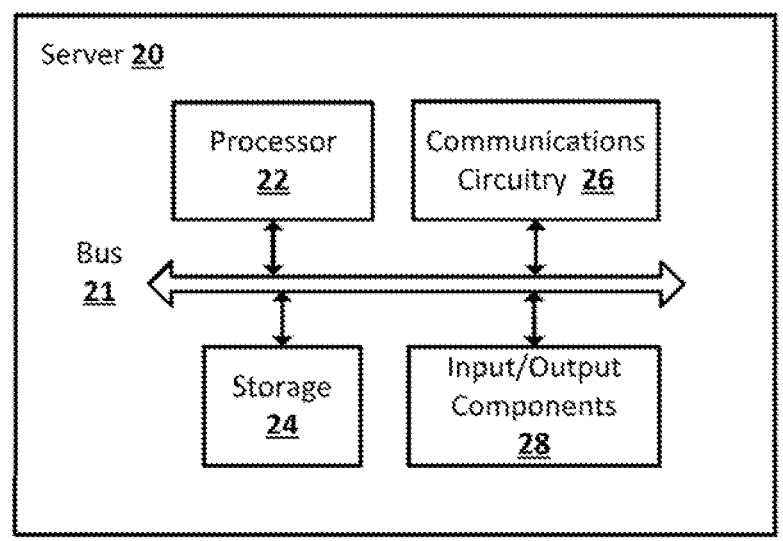
FIG. 1 shows a block diagram of a server according to an implementation of the disclosed subject matter.

FIG. 1 shows a block diagram of a server according to an implementation of the disclosed subject matter. The server 20 may include a bus 21 which interconnects major components of the server 20, such as a processor 22, a storage 24, communications circuitry 26, and input/output components 28. The processor 22 may be any suitable programmable control device and may control the operation of one or more processes such as media verification and authorization as discussed herein and other processes performed by the server 20.

The storage 24 may be integral with the server 20 or may be separate and accessed through an interface. The storage 24 may store media content (e.g. video, music, photos, applications, and documents etc.), software (e.g., for implementing various functions on server 20), and other data. The storage 24 may include a suitable storage medium, such as one or more hard-drives, solid state drives, flash drives, and the like.

The input/output components 28 may include outputs components and/or interfaces for a display that provides visual output and may include a touch-sensitive screen. The input/output component may also include input components and/or interfaces for user input devices that allow a user to interact with the server 20. For example, the user input devices may include a keyboard, a keypad, a mouse, touchpad, a touch screen, and the like.

Figure 2:
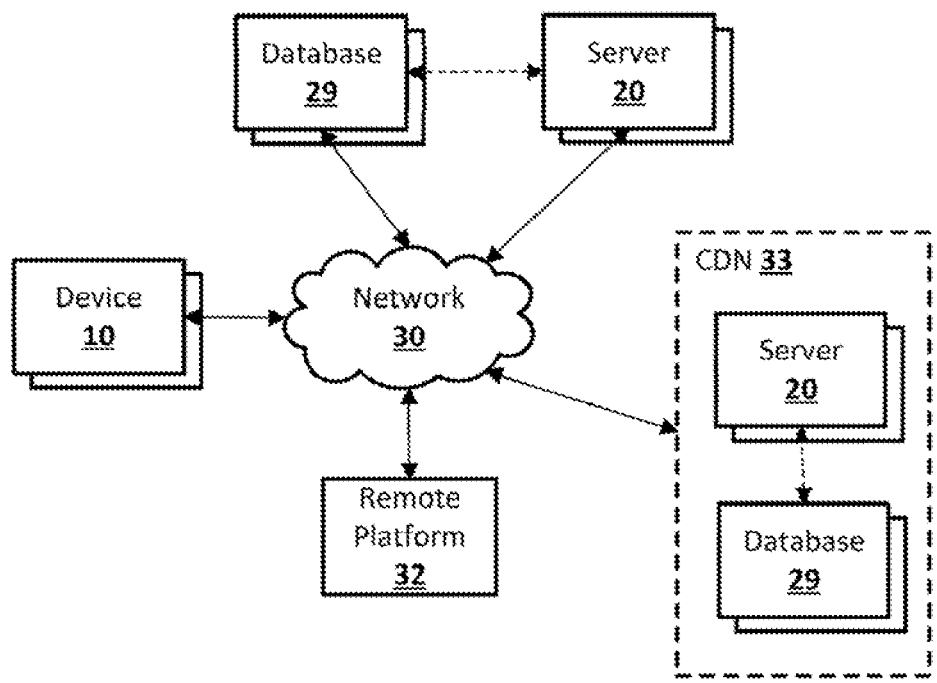
FIG. 2 shows an example network arrangement according to an implementation of the disclosed subject matter.

The communications circuitry 26 may include one or more interfaces to allow the server 20 to communicate with other servers 20, devices 10 and/or databases 29 via one or more local, wide-area, or other networks, as shown in FIG. 2. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor to control such communications intensive tasks such as packet switching, content management, and content delivery.

The server 20 may host one or more applications configured to manage services that may be associated with a user account. For example, the server may be configured to validate a device (e.g. device 10 as shown in FIG. 2) before the device is authorized to perform media related functions, including accessing locally stored media and/or media that available from a remote source. The server may maintain information related to a user account including account details, locally stored music, subscribed play lists, managed play lists, play back history, etc. As described, the server 20 may operate a media library (or media archive), which may be accessed by the device. Also, the server 20 may host one or more applications configured to interact with applications stored on the device to perform media synchronization, verification, and authorization.

FIG. 2 shows an example network arrangement according to an implementation of the disclosed subject matter. Implementations may include one or more devices 10 which may include or be part of a variety of types of computing devices, such as a handheld device including a mobile phone or "smartphone," tablet computer, laptop, netbook, desktop, personal digital assistant ("PDA"), media device, set-top box, television, and/or watch, among others. The device 10 may include a bus, processor, storage, communications circuitry, and input/output components as described above. The network 30 may be a local network, wide-area network (including the Internet), or any other suitable communication network or networks, and may be implemented on any suitable platform including wired and/or wireless networks. The network 30 may be part of a public and/or a private network any may also include one or more gateways, which facilitate the transfer of data between devices using different protocols. Further, the network 30 may include secure links and/or unsecure links. Additionally, the network 30 may include network infrastructure provided by multiple parties, such as a host network and one or more partner networks (e.g. roaming partners). The devices 10 may communicate with other devices 10 and one or more servers 20 and/or databases 29.

Server 20 may be directly accessible by the device 10, or one or more other devices 10 may provide intermediary access to a server 20. The device 10 and/or server 20 may access remote platforms 32 or services provided by remote platforms 32 such as cloud computing arrangements and services. The remote platform 32 may include one or more servers 20 and/or databases 29. The term server may be used herein and may include a single server or one or more servers. For example, a server 20 may include one or more servers responsible for verification, authentication, licensing, and delivering and/or storing media files (which may be part of a Content Delivery Network (CDN) 33), or any combination thereof including additional or fewer types of servers.

Although examples described herein relate to a media file as music, the media file (and/or media content) may also include other media types such as video, documents (e.g. eBooks), applications ("apps"), and others forms of media and/or content that may, for example, require a server to provide digital rights management (DRM) capabilities. The media file may include various file formats. For example, a media file for music may include files types such as .mp3, .aac, .wma, .m4a, .wav, and other suitable file types. In another example, a media file for video may include various mpeg file types and other suitable formats including those used in streaming protocols.

Figure 3:
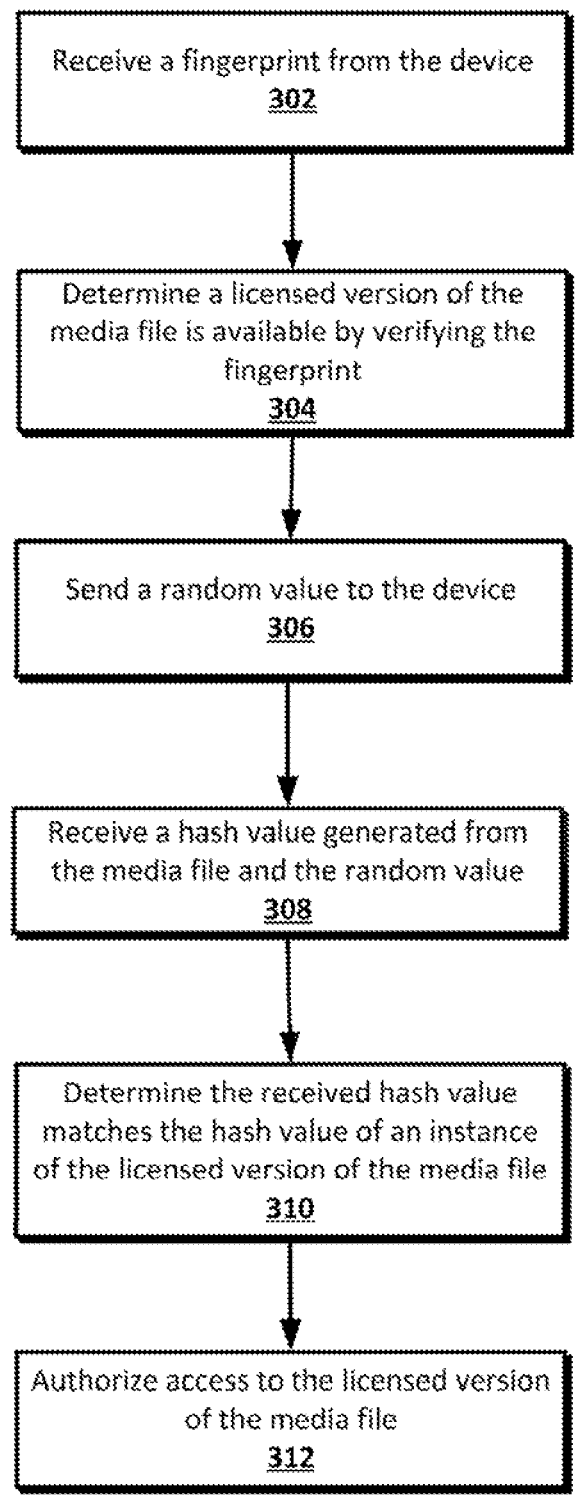
FIG. 3 shows a flow diagram of verifying access rights to a media file according to an implementation of the disclosed subject matter.

FIG. 3 shows a flow diagram of verifying access rights to a media file according to an implementation of the disclosed subject matter. As described above, a server (e.g. sever 20) may authorize a device (e.g. device 10) to access media from a cloud-based service. For example, a service may allow a user to perform a music matching operation. As described herein, a matching operation may include synchronization and/or replication of all or portions of a media collection. Accordingly, a matching operation may replicate (or synchronize) a user's media collection with a media collection stored on a centralized server (e.g., a cloud-based service) in order to access their media collection remotely through a user account. In certain situations, it may be more efficient to allow the user to access a licensed version (aka "golden copy" or master copy) of the same media file stored in a media library of the service instead of uploading each media file.

As described, a service may include a media library including a collection of licensed media files. As referred to herein, a licensed version of a media file may include a media file that is authorized to be stored and/or available (e.g. for purchase) on a server of a cloud-based service. For example, a user may be able to purchase a licensed version of a song from an online retailer. The access terms for media available in the media library may be controlled by a content distributor such as a content creator (e.g. artist), record label, movie studio, etc. For example, access terms may require that even a cloud-based service store an individual version of a media file in each user account's media collection. To comply with specific licensing agreements with content distributors, a server may, for example, confirm that the user has acquired access rights to the media file before it may be uploaded or accessed from the cloud. For example, access terms may dictate that a user must actually possess a verifiable version of a media file (e.g. the user must purchase or have previously purchased the content) as a requirement to provide access through a cloud-based service. Accordingly, by verifying the media file stored on the user's device matches a version available for purchase, the service may determine that the user has legitimate access rights to the file.

In an implementation, the process for authorizing access rights to media files through a cloud-based service may involve a two-step process. First, a server may verify that a particular media file is available in the media library. Second, the server may confirm ownership of the media title by verifying the user actually possesses an instance of a licensed version of the media file. In an alternative implementation, instead of a two-step process, the server may authorize access rights in a single step by verifying that the user possesses an instance of the licensed version of the media file.

As described above, a server may determine whether a particular media file is available in a media library. In 302, a server may receive, from a device associated with a user account, a first fingerprint generated from a media file stored on the device. In order to avoid having to transfer an entire media file for verification, a fingerprint generated from the media file may be used to verify that a particular content item (e.g. instance of a licensed media file) is available in a media library. The fingerprint allows the server to uniquely identify a particular media file and may be generated from various portions of the file including the content data and/or metadata. The content data refers to the actual bits of data representing the media content itself. For example, the content data represents the bits of data representing the audio for a music file. In contrast, the metadata includes data relating to information such as the filename, file size, title, artist, album, genre, length, tags, and other information. In one example, the fingerprint may be generated from the data portion of the media file. In another example, a fingerprint may include metadata information such as the title, artist, and track length may be used to uniquely identify a particular content item. In an implementation, the fingerprint may be a hash value generated from one or more portions of the media file. When generating a hash value in 302, any suitable hash function may be used including cryptographic and non-cryptographic functions.

In 304, the server may determine an instance of the licensed version of the media file is available in a stored media library. This determination may be based on verifying that the received first fingerprint matches a second fingerprint generated from the instance of the licensed version of the media file. The second fingerprint from the instance of the licensed version of the media file may be generated in a similar manner as described above in 302. If the first and second fingerprints match, the server may confirm that a certain media title is available in the media library. In an implementation, when a user attempts to upload or synchronize their media collection with the cloud-based service, only titles that are available in the media library of the service may be accessible from the cloud due to certain licensing requirements. For example, media files that do not match an instance of the licensed version of the media file may be presumed to be bootlegged or unlicensed copies according to content distributors. The server may also perform additional operations in order to verify whether a particular media title is available in a media library. For example, the server may normalize a bit rate of the media file stored on the device to match a bit rate of the instance of the licensed version of the media file. In addition, the server may transcode the media file to match a file type of the instance of the licensed version of the media file. For example, if the music file is stored on the device as a ".wav" file format, the media device may transcode the file to an ".mp3" file format to match the file format of the instance of the licensed version in the media library.

Once a media file has been confirmed as available in the media library, a more robust verification process may occur to confirm that the user is in actual possession of the media file. The verification process may include sending a cryptographic challenge to the device for the device to confirm that it is in possession of the media file. This verification process may employ a cryptographic hash operation that utilizes a random value or "salt." The addition of the random value improves security of the hashing operations because it makes it more difficult (e.g. requires more storage, processing power, and/or time) to perform attacks against the hashing technique.

The random value may be generated using various techniques and may vary in size. For example, the random value may be a 128-bit integer. The random value may be generated specifically for a particular media file. The random value may also have an expiration, and thus, be regenerated periodically. For instance, a new random value may be regenerated every few hours. The server may store the random value and associate the value with identification information. The identification information may correspond to a particular time period, user, device, and/or media file. The random value and identification information may be stored in a storage or database that may be accessible by the server.

In 306, the server may send the generated random value to the device. This random value may be necessary to generate a cryptographic hash of the media file stored on the device. The cryptographic hash may be required in order for the device to respond to a challenge provided by the server. When sending the random value to the device, a secure manner transmission technique may be use such as a Hypertext Transfer Protocol Secure (HTTPS) connection, or through other secure technique such as public/private key encryption. When sending a challenge to the device, the server may send the random value, and in some implementations, a hash-type value indicating the nature of the required hash. For example, the hash-type value may be a string that includes the random value (e.g. salt) length and the hash type. For example, a hash-type value may be "128+SHA1," indicating that 128 bits of salt and a SHA1 hash are to be generated. Any suitable cryptographic hash functions with varying bit lengths may be used including SHA as described, as well as MD5, and other techniques including any new hash techniques that may be developed.

Once the device receives the random value, the device may respond to the challenge. The response involves performing a hashing algorithm of the media file combined with the received random value. For example, the hash may be generated from the data portion of a music file along with the received random value. In an implementation, the challenge may require generating a hash from the entire media file (e.g. all data portions). Generating a hash from an entire file provides an additional layer of security. For instance, generating a hash from the entire file confirms the user actually possesses entire file and not merely a specific portion of the file, which may be more susceptible to illegitimate distribution.

In 308, the server may receive, from the device, a first hash value generated from a predefined portion of the media file combined with the generated random value. The device may send the generated hash value as a response to the challenge from the server. The device may transmit the generated hash value to the server using a secure transmission method as described above.

In 310, the server may determine that the received first hash value matches a second hash value generated from the predefined portion of the instance of the licensed version of the media file combined with the generated random value. The server may generate a hash value for the instance of the licensed version of the media file by performing the same hashing algorithm as performed in 306. If the server received first hash value from the device matches the second hash value generated from the instance of the licensed version of the media file, the server may confirm that the user has legitimate access rights to the media. In an implementation, if the hash values do not match, the server may not grant access rights to the media from the cloud-based service.

In 312, the server may authorize a user account to remotely access the licensed version of the media file. Access to media content may include the ability to play, download, install, store, open, or otherwise "access" the content. For example, if the media content is a music file, the device may play (e.g. download and/or stream) the song. The server may also enforce particular DRM policies. For example, DRM policies may restrict access to the media content to only one device at a time. Accordingly, access to the media content to a second device may require the access be delegated from one device to another.

Steps 302 to 312 may be repeated for additional media files. In addition, the steps described above may be performed for multiple media files at a time. For example, the server may receive a fingerprint of multiple media files in 302, and then perform a verification process for each of the received fingerprints in 304. In order to comply with certain licensing terms of a content distributor, in an implementation, a copy of the licensed version of a media file may be stored in a storage designated for the user account.

As described above, a user may wish to replicate their media collection to a remote location by performing a matching operation. This may be done through an application executed from the device and/or server. For example, a media management application may be downloaded from the server and installed on the device. The application may be used in conjunction with a cloud-based service. For example, a new media collection may be created when a media service account is initialized or an application may incorporate additional material into an existing collection. In order to synchronize, replicate, and/or upload all or a portion of a media collection, the device may be scanned for media. The locations to be scanned may be predetermined and/or customized prior to a scan. In addition, the set of media file types may be customized by a user prior to a scan to include one or more file types. The media files may also represent content downloaded from on-line music retailers and content "ripped" from physical storage media such as a CD.

Figure 4:
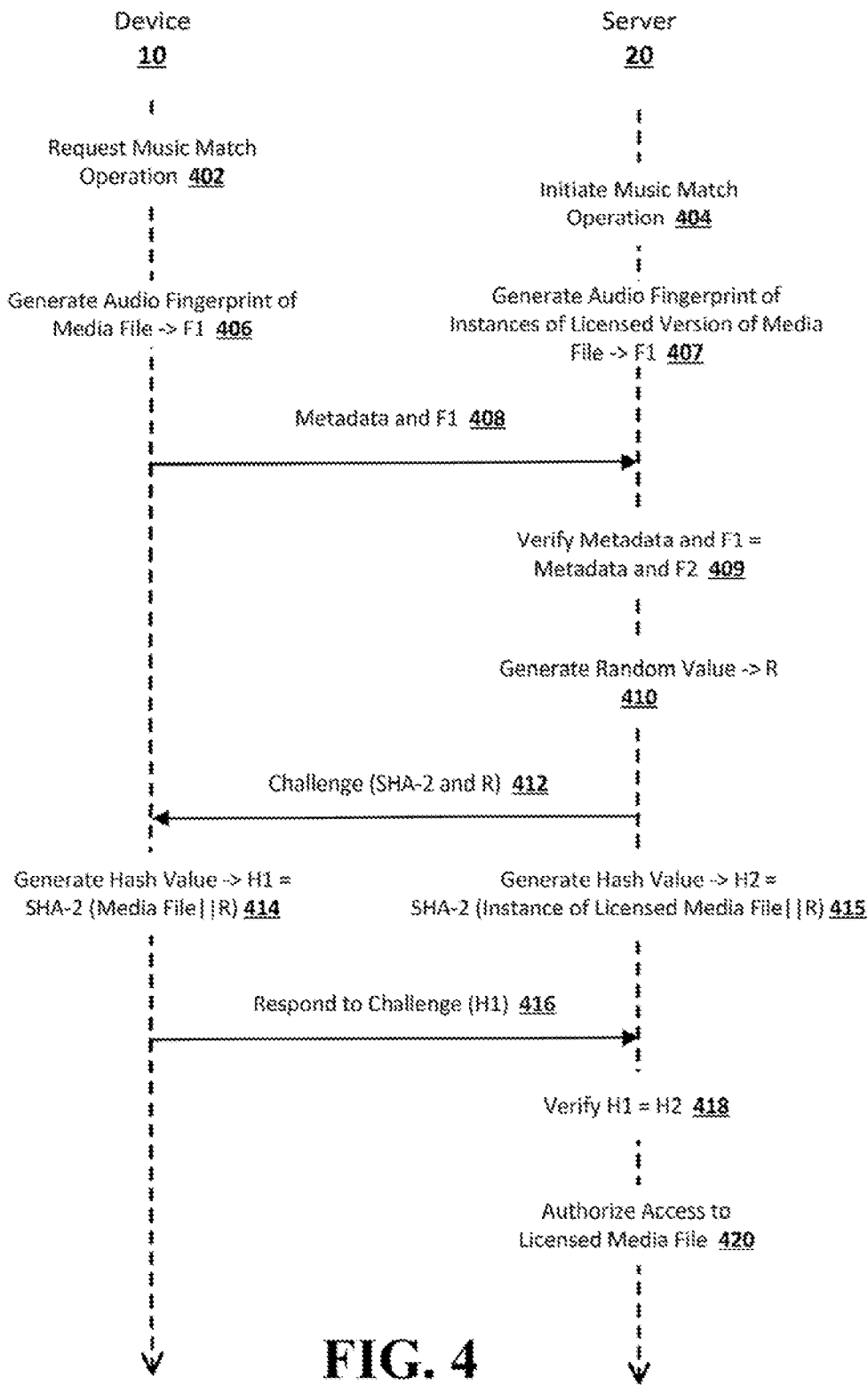
FIG. 4 shows a process flow for a music matching operation using a cryptographic hash according to an implementation of the disclosed subject matter.

FIG. 4 illustrates a process flow for a music matching operation using a cryptographic hash according to an implementation of the disclosed subject matter. As described above, a user may wish to replicate an entire media collection or a portion of a media collection to a cloud-based service. Accordingly, in 402, a user may request a music match service. In 404, the server may initiate the music match service. Accordingly, the server may instruct the device to generate a fingerprint, and in 406, an audio fingerprint F1 of a media file stored on the device may be generated. As described above, F1 may be generated based on the audio bytes (e.g. content portion) of the media file. In 408, the device may send the audio fingerprint F1, along with metadata information of the media file, to the server. As shown, the server may also generate an audio fingerprint an instances of licensed versions of the media file in 407. It should be noted that although 407 is shown as being in parallel with 406, the generation of fingerprint F2 may occur prior to 406, during, and/or after performing 406 including in conjunction with 409. In 409, the server verifies whether the fingerprint F1 and the metadata of the media file matches fingerprint F2 and the metadata of any instances of the licensed version of the media file. If there is a match, the server may confirm that a particular media title (e.g. song) is available in a media library. In some instances, a match may not be verified. For example, if the metadata does not correspond to any title in the media library, it may not be possible to even generate F2 as there is not a corresponding licensed version of the media file. In such a situation, the server may provide a notification and/or database entry that a particular media file is not available in the media library.

In situations where a match has been verified, the server may proceed with the process and generate a random value R (e.g. salt) in 410. In 412, a challenge may be sent to the device in order to confirm that the device is in actual possession of the entire media file. The challenge may include a hash-type (e.g. SHA-2 as shown in this example) along with the generated random value R. Although this example uses a SHA hash function, other cryptographic hash functions may also be used. In response, a hash value may be generated by performing a hash operation in 414. As shown, the hash operation may include performing a SHA-2 hash function (e.g. SHA-256) on the media file combined with the random value R to generate hash value H1. In an implementation, the hash function may be performed on the entire content portion of the media file. For example, the hash function may be performed on all of the audio bytes of the media file to verify the user is in possession of the entire title (e.g. song) and not merely a portion. In 416, the device may respond to the challenge by sending the generated hash value H1 to the server. As shown, the server may also generate hash value H2 by performing the same hash operation on the instance of the licensed version of the media file and R in 415. It should be noted that although 415 is shown as being in parallel with 414, the generation of H2 may occur prior to 414, during, and/or after performing 414 including in conjunction with 418. In 418, the server verifies that hash value H1 matches hash value H2. If there is a match, the server may confirm that the user is in actual possession of the entire media file and the server may authorize the user and/or device to access the licensed version of the media file in 420. Accordingly, as described above, the server may confirm in a secure manner that the user is in actual possession of a media file without having to upload the entire media file.

Various implementations may include or be embodied in the form of computer-implemented process and an apparatus for practicing that process. Implementations may also be embodied in the form of a non-transitory computer-readable storage and/or memory containing instructions, wherein, when the instructions are loaded into and executed by a computer (or processor), the computer becomes an apparatus for practicing implementations of the disclosed subject matter.

The flow diagrams described herein are included as examples. There may be variations to these diagrams or the steps (or operations) described therein without departing from the implementations described herein. For instance, the steps may be performed in parallel, simultaneously, a differing order, or steps may be added, deleted, or modified. Similarly, the block diagrams described herein are included as examples. These configurations are not exhaustive of all the components and there may be variations to these diagrams. Other arrangements and components may be used without departing from the implementations described herein. For instance, components may be added, omitted, and may interact in various ways known to an ordinary person skilled in the art.

References to "one implementation," "an implementation," "an example implementation," and the like, indicate that the implementation described may include a particular step, feature, structure, or characteristic, but every implementation may not necessarily include the particular step, feature, structure, or characteristic. Moreover, such phrases are not necessarily referring to the same implementation. Further, when a particular step, feature, structure, or characteristic is described in connection with an implementation, such step, feature, structure, or characteristic may be included in other implementations whether or not explicitly described. The term "substantially" may be used herein in association with a claim recitation and may be interpreted as "as nearly as practicable," "within technical limitations," and the like.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   sending, from a device associated with a user account, a request to a server to synchronize at least one media file stored on the device with a remotely-accessible media collection stored on the server; and
   for each media file of the at least one media file:
      sending, from the device associated with the user account to the server, a first fingerprint generated by the device based on the media file stored on the device;
      if the server verifies that the first fingerprint matches a second fingerprint generated at the server from an instance of the licensed version of the media file and that a licensed version of the media file is available in a media library stored on the server, receiving, at the device, a generated random value from the server;
      sending, from the device to the server, a first hash value generated from a predefined portion of the media file combined with the generated random value; and
      if the server determines that the received first hash value matches a second hash value generated from the predefined portion of the instance of the licensed version of the media file combined with the generated random value, remotely accessing the licensed version of the media file stored on the server.

2. The computer-implemented method of claim 1, wherein the predefined portion of the media file is defined based on selecting a randomly generated portion specific to the media file.

3. The computer-implemented method of claim 1, wherein the predefined portion of the media file is substantially an entire content portion of the media file.

4. The computer-implemented method of claim 1, wherein the predefined portion of the media file is an entirety of the media file.

5. The computer-implemented method of claim 1 wherein the at least one media file comprises a media collection stored on the device.

6. The computer-implemented method of claim 1, further comprising sending, from the device to the server, the media file and wherein the user account is authorized to remotely access the received media file.

7. The computer-implemented method of claim 1, wherein the first fingerprint is generated from content data and metadata from the media file.

8. The computer-implemented method of claim 1, wherein the first hash is generated using a cryptographic hash function.

9. The computer-implemented method of claim 1, wherein the random value is received in a secure transmission.

10. A device associated with a user account, comprising:
    a processor, the processor configured to:
       send, from the device associated with the user account, a request to a server to synchronize at least one media file stored on the device with a remotely-accessible media collection stored on a server; and
       for each media file of the at least one media file:
          send, from the device associated with the user account to the server, a first fingerprint generated by the processor from the media file stored on the device;
          if the server verifies that the received first fingerprint matches a second fingerprint generated from an instance of the licensed version of the media file, and that a licensed version of the media file is available in a media library, receiving, at the device, a generated random value from the server;
          sending, from the device to the server, a first hash value generated from a predefined portion of the media file combined with the generated random value; and
          if the server determines that the received first hash value matches a second hash value generated from the predefined portion of the instance of the licensed version of the media file combined with the generated random value, remotely accessing the licensed version of the media file stored on the server.

11. The device of claim 10, wherein the predefined portion of the media file is defined based on selecting a randomly generated portion specific to the media file.

12. The device of claim 10, wherein the predefined portion of the media file is substantially an entire content portion of the media file.

13. The device of claim 10, wherein the predefined portion of the media file is an entirety of the media file.

14. The device of claim 10, wherein the at least one media file comprises a media collection stored on the device.

15. The device of claim 10, the processor further configured to receive, from the device, the media file and wherein the user account is authorized to remotely access the received media file.

16. The device of claim 10, wherein the first fingerprint is generated from content data and metadata from the media file.

17. The device of claim 10, wherein the first hash is generated using a cryptographic hash function.

18. The device of claim 10, wherein the random value is received in a secure transmission.

19. A non-transitory computer readable medium having program instructions embodied thereon, the program instructions comprising:
   program instructions for sending, from a device associated with a user account, a request to a server to synchronize at least one media file stored on the device with a remotely-accessible media collection stored on the server; and
   program instructions for performing the following, for each media file of the at least one media file:
      sending, from the device associated with the user account to the server, a first fingerprint generated by the device from the media file stored on the device;
      if the server verifies that the first fingerprint matches a second fingerprint generated at the server from an instance of the licensed version of the media file and that a licensed version of the media file is available in a media library stored on the server, receiving, at the device, a generated random value from the server;
      sending, from the device to the server, a first hash value generated from a predefined portion of the media file combined with the generated random value; and
      if the server determines that the received first hash value matches a second hash value generated from the predefined portion of the instance of the licensed version of the media file combined with the generated random value, remotely accessing the licensed version of the media file stored on the server.

* * * * *